United States Patent
Kim

(10) Patent No.: US 8,914,065 B2
(45) Date of Patent: Dec. 16, 2014

(54) METHOD AND APPARATUS FOR SENDING TEXT MESSAGE IN MULTI SUBSCRIBER IDENTITY MODULE MOBILE TERMINAL

(75) Inventor: Seung-Joung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 13/617,352

(22) Filed: Sep. 14, 2012

(65) Prior Publication Data

US 2013/0217424 A1 Aug. 22, 2013

(30) Foreign Application Priority Data

Feb. 17, 2012 (KR) .................. 10-2012-0016491

(51) Int. Cl.
*H04M 1/00* (2006.01)

(52) U.S. Cl.
USPC ......... 455/558; 455/412.1; 455/416; 455/417

(58) Field of Classification Search
USPC ............... 455/412.1, 450, 452.1, 552.1, 558
See application file for complete search history.

(56) References Cited

U.S. PATENT DOCUMENTS

| | | | |
|---|---|---|---|
| 2008/0064443 A1* | 3/2008 | Shin et al. | 455/558 |
| 2008/0167074 A1* | 7/2008 | Van Steenbergen | 455/558 |
| 2009/0017817 A1* | 1/2009 | Bleckert et al. | 455/433 |
| 2009/0029736 A1* | 1/2009 | Kim et al. | 455/558 |
| 2009/0061932 A1* | 3/2009 | Nagarajan | 455/558 |
| 2009/0104939 A1* | 4/2009 | Lee | 455/558 |
| 2009/0149220 A1* | 6/2009 | Camilleri et al. | 455/558 |
| 2010/0279698 A1* | 11/2010 | Wong | 455/450 |
| 2011/0081951 A1* | 4/2011 | Hwang | 455/558 |
| 2011/0223866 A1* | 9/2011 | Cho | 455/41.3 |
| 2012/0115545 A1* | 5/2012 | Middleton | 455/558 |
| 2012/0135715 A1* | 5/2012 | Kang et al. | 455/412.1 |
| 2013/0137484 A1* | 5/2013 | Torres | 455/558 |
| 2013/0260778 A1* | 10/2013 | Roullier | 455/452.1 |

* cited by examiner

*Primary Examiner* — Nathan Taylor
(74) *Attorney, Agent, or Firm* — Jefferson IP Law, LLP

(57) ABSTRACT

A method and apparatus for sending a text message in a multi Subscriber Identity Module (SIM) mobile terminal are provided. The method includes determining a SIM which is responsible for sending the text message among a plurality of SIMs and sending the text message through a mobile communication service provider network corresponding to the SIM determined to be responsible for sending the text message.

15 Claims, 3 Drawing Sheets

METHOD AND APPARATUS FOR SENDING TEXT MESSAGE IN MULTI SUBSCRIBER IDENTITY MODULE MOBILE TERMINAL

PRIORITY

This application claims the benefit under 35 U.S.C. §119 (a) of a Korean patent application filed on Feb. 17, 2012 in the Korean Intellectual Property Office and assigned Serial No. 10-2012-0016491, the entire disclosure of which is hereby incorporated by reference.

BACKGROUND OF THE INVENTION

1. Field of the Invention

The present invention relates to a method and apparatus for sending a text message. More particularly, the present invention relates to a method and apparatus for sending a text message in a multi Subscriber Identity Module (SIM) mobile terminal

2. Description of the Related Art

Mobile terminals developed for using mobile communication services have increasingly become necessities of life. Such mobile terminals have added computer supporting functions such as an Internet communication function and an information search function. In addition, such mobile terminals may have installed applications which users want to install.

In addition, multi SIM mobile terminals, each of which includes a plurality of SIMs, are being produced. A SIM stores personal information capable of using a variety of services of a mobile communication company, such as an authentication service, a billing service, and a security service. Accordingly, the user may use mobile communication services provided from a plurality of mobile communication companies using one mobile terminal.

In general, each of the mobile communication companies provides a text message service which is, for example, a service for sending contents including characters to a counterpart terminal. There is a mobile communication company which proposes sending costs for text messages, which are relatively inexpensive, due to competition among the mobile communication companies.

When sending a text message, a conventional multi SIM mobile terminal uses a mobile communication service provider network of a SIM which is currently maintained. Accordingly, in order to use a mobile communication service provider network in which sending costs for text messages are relatively inexpensive, the user must convert the SIM which is currently maintained into another SIM. This results in an inconvenience to the user.

Therefore, a need exists for a method and apparatus for sending a text message through a mobile communication service provider network which is fully responsible for sending the text message in a multi SIM mobile terminal. A need also exists for provide a method and apparatus for sending a text message at little cost in a multi SIM mobile terminal.

The above information is presented as background information only to assist with an understanding of the present disclosure. No determination has been made, and no assertion is made as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for sending a text message through a mobile communication service provider network which is fully responsible for sending the text message in a multi SIM mobile terminal.

Another aspect of the present invention is to provide a method and apparatus for sending a text message at little cost in a multi Subscriber Identity Module (SIM) mobile terminal.

In accordance with an aspect of the present invention, a method of sending a text message in a multi SIM mobile terminal is provided. The method includes determining a SIM which is responsible for sending the text message among a plurality of SIMs, and sending the text message through a mobile communication service provider network corresponding to the SIM determined to be responsible for sending the text message.

In accordance with another aspect of the present invention, an apparatus for sending a text message in a multi SIM mobile terminal is provided. The apparatus includes an input unit for receiving the text message input by a user, a SIM providing unit which mounts a plurality of SIMs, and a controller for controlling mobile communication through the plurality of SIMs, wherein the controller determines a SIM which is responsible for sending the text message among the plurality of SIMs when receiving the text message to be sent from the input unit and sends the text message through a mobile communication service provider network corresponding to the SIM determined to be responsible for sending the text message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
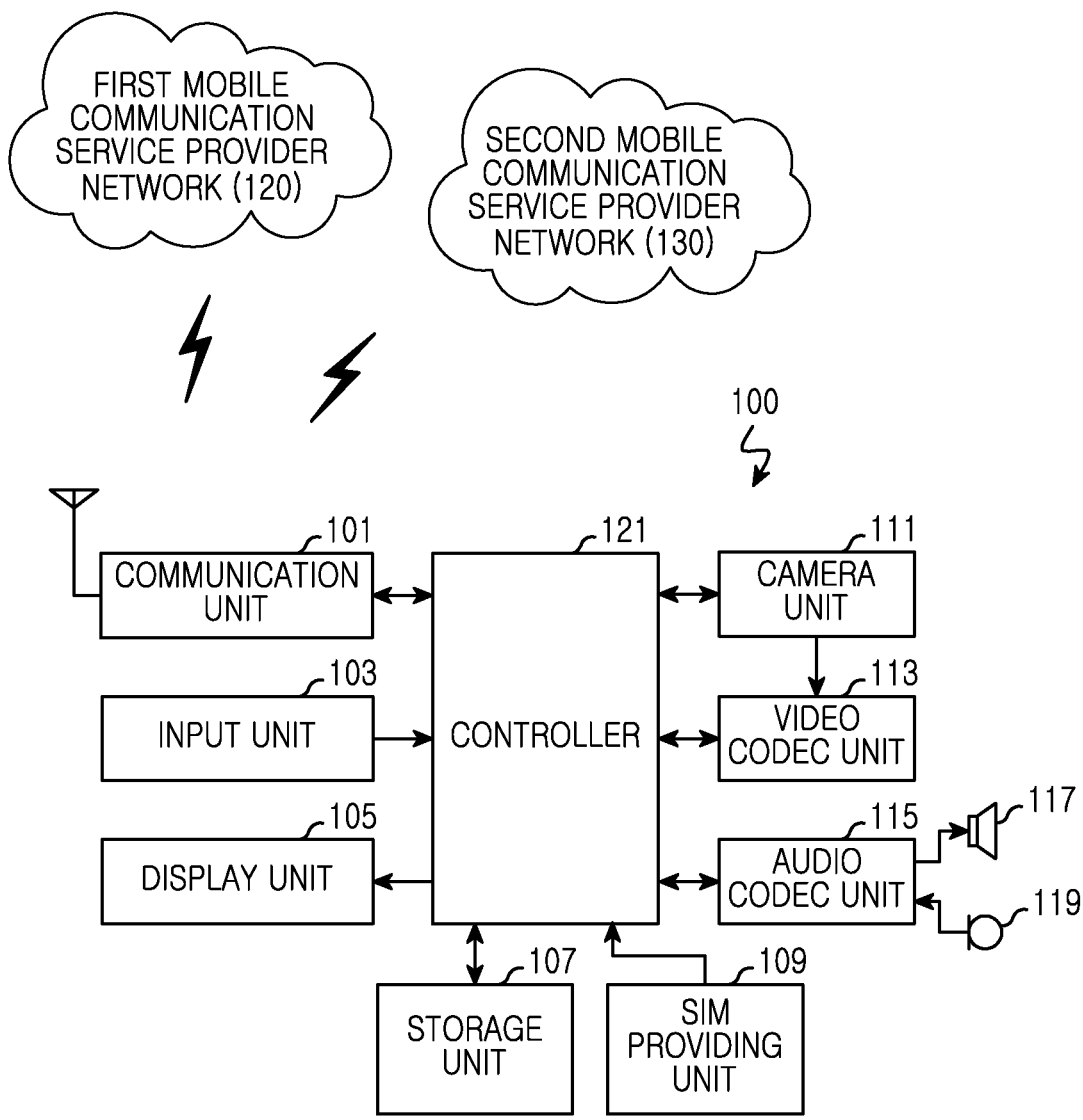
FIG. 1 is a block diagram illustrating a mobile communication system according to an exemplary embodiment of the present invention.

Exemplary embodiments of the present invention described hereinafter relate to a method and apparatus for sending a text message through a mobile communication service provider network which is fully responsible for sending the text message in a multi SIM mobile terminal FIG. 1 is a block diagram illustrating a mobile communication system according to an exemplary embodiment of the present invention.

Referring to FIG. 1, the mobile communication system includes a multi SIM mobile terminal 100 and a plurality of mobile communication service providers 120 and 130 (e.g., first and second mobile communication service provider networks 120 and 130), each of the plurality of mobile communication service providers for providing a mobile communication service to the multi SIM mobile terminal 100.

The multi SIM mobile terminal 100 may be a cellular phone, a Personal Communication System (PCS), a Personal Data Assistant (PDA), an Internal Mobile Communication (IMT) 2000 terminal, a 4 Generation (G) broadband system terminal, or the like.

Hereinafter, a description will be given using general configuration of each of the above-described terminals.

According to exemplary embodiments of the multi SIM mobile terminal 100 includes a communication unit 101, an input unit 103, a display unit 105, a storage unit 107, a SIM providing unit 109, a camera unit 111, a video codec unit 113, an audio codec unit 115, a speaker 117, a microphone 119, and a controller 121.

The communication unit 101 sets up an environment for wire communication or wireless communication. For example, the communication unit 101 down-converts a Radio Frequency (RF) signal received through an antenna and provides the down-converted signal to the controller 121. The communication unit 101 up-converts a baseband signal from the controller 121 and transmits the up-converted signal thorough the antenna.

The input unit 103 has a plurality of buttons. The input unit 103 provides an input signal corresponding to a button pushed by a user to the controller 121.

The display unit 105 outputs an image under control of the controller 121. The controller 121 demodulates an image data through the video codec unit 111 and outputs the demodulated data on the display unit 105.

The storage unit 107 stores programs for controlling an overall operation of the multi SIM mobile terminal 100 and a variety of data items input and output when a control operation of the multi SIM mobile terminal 100 is performed.

The SIM providing unit 109 mounts a plurality of SIMs. The controller 121 may connect to the first and second mobile communication service provider networks 120 and 130 through the SIMs of the SIM providing unit 109. Each of the SIMs stores personal information capable of using a variety of services of a mobile communication company, such as an authentication service of a subscriber, a billing service, and a security service. The multi SIM mobile terminal 100 may use the first and second mobile communication service provider networks 120 and 130.

The camera unit 111 photographs an object, generates an image data, and outputs the image data to the video codec unit 113.

The video codec unit 113 modulates the image data provided from the camera unit 111 and provides the modulated image data to the controller 121. Also, the video codec unit 113 demodulates an image data provided from the controller 121 and provides the demodulated image data through the display unit 105.

The audio codec unit 115 modulates a voice data provided from the microphone 117 and provides the modulated voice data to the controller 121. Also, the audio codec unit 115 demodulates a voice data provided from the controller 121 and outputs the demodulated voice data through the speaker 117.

The controller 121 performs process and control for audio communication, video communication, and data communication.

Hereinafter, a description will be given with respect to a method of sending a text message at the controller 121 with reference to drawings. The text message may be a Short Message Service (SMS) message or a Multimedia Message Service (MMS) message.

Figure 2:
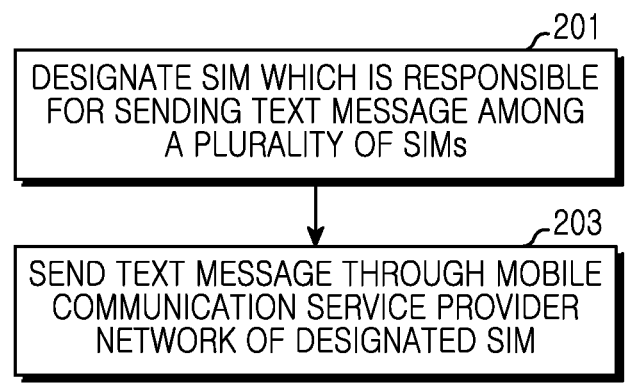
FIG. 2 is a flowchart illustrating a process of sending a text message in a multi SIM mobile terminal according to an exemplary embodiment of the present invention.

FIG. 2 is a flowchart illustrating a process of sending a text message in a multi SIM mobile terminal according to an exemplary embodiment of the present invention.

Referring to FIG. 1 and FIG. 2, the controller 121 designates (e.g., determines) a SIM which is responsible for sending a text message among a plurality of SIMs in step 201. As an example, the controller 121 allows a user to designate the SIM which is responsible for sending the text message.

In step 203, the controller 121 sends the text message through a mobile communication service provider network corresponding to the designated SIM. Accordingly, the controller 121 sends the text message through a mobile communication service provider network of a SIM which is responsible for sending the text message.

Figure 3:
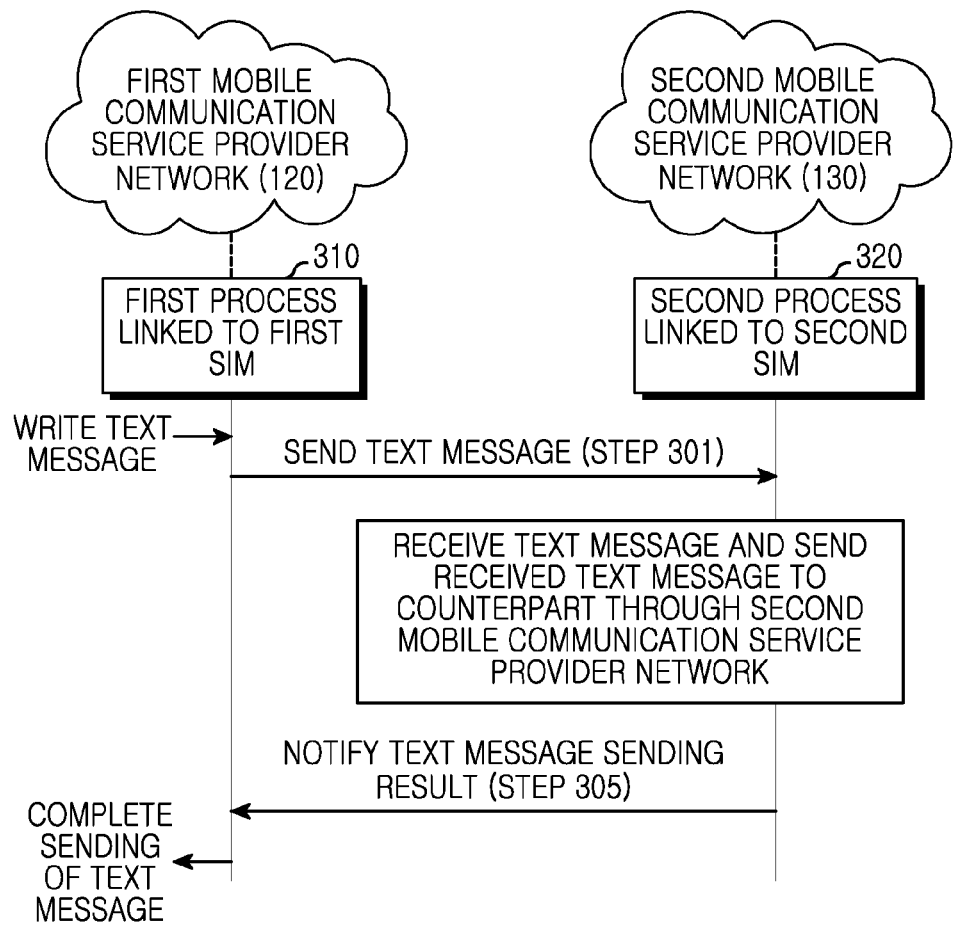
FIG. 3 is a signal sequence diagram illustrating a process of sending a text message in a multi SIM mobile terminal according to an exemplary embodiment of the present invention.

FIG. 3 is a signal sequence diagram illustrating a process of sending a text message in a multi SIM mobile terminal according to an exemplary embodiment of the present invention.

Referring to FIG. 1 and FIG. 3, the controller 121 performs a first process 310 linked to a first SIM and a second process 320 linked to a second SIM. The first process 310 corresponds to a certain processing means using the first mobile communication service provider network 120 through the first SIM. Also, the second process 320 corresponds to a certain processing means using the second mobile communication service provider network 130 thorough the second SIM. The controller 121 permits communication between the first process 310 and the second process 320. The controller 121 may multi-task the first process 310 and the second process 320 simultaneously.

The controller 121 sends a text message written by a user to the second process 320 linked to the second SIM through the first process 310 linked to the first SIM in step 301. In accordance with one exemplary embodiment of the present invention, the controller 121 designates the second SIM as a SIM which is responsible for sending the text message.

The controller 121 receives the text message through the second process 320 linked to the second SIM and sends the received text message to a counterpart through the second mobile communication service provider network 130 in step 303. Particularly, the controller 121 may change designation information of the text message to subscriber information of the first SIM through the second process 320 linked to the second SIM. Accordingly, the text message is sent using the second mobile communication service provider network 130 through the second SIM. However, a recipient knows that the text message is sent from a subscriber of the first SIM.

The controller 121 notifies the text message sending result to the first process 310 through the second process 320 in step 305. The controller 121 informs the sending completion of the text message to the user through the first process 310.

In conclusion, a multi SIM mobile terminal according to an exemplary embodiment of the present invention may be responsible for sending a text message through a mobile communication service provider network in which sending costs for text messages are relatively inexpensive.

It will be appreciated that exemplary embodiments of the present invention according to the claims and description in the specification can be realized in the form of hardware, software or a combination of hardware and software.

Any such software may be stored in a computer readable storage medium. The computer readable storage medium stores one or more programs (e.g., software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention.

Accordingly, exemplary embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of sending a text message in a multi Subscriber Identity Module (SIM) mobile terminal, the method comprising:
    determining a second SIM which the mobile terminal is configured to use for sending the text message among a plurality of SIMs;
    generating, through a first process linked to a first SIM of the plurality of SIMs, the text message;
    sending, through the first process, the text message to a second process linked to the second SIM; and
    sending the text message through a mobile communication service provider network corresponding to the second SIM,
    wherein the first process corresponds to a processing means using a first mobile communication service provider network through the first SIM,
    wherein the second process corresponds to a processing means using the mobile communication service provider network corresponding to the second SIM,
    wherein the first SIM is different from the second SIM, and
    wherein a controller permits communication between the first process and the second process.

2. The method of claim 1, wherein the sending of the text message through the mobile communication service provider network corresponding to the second SIM comprises:
    sending the text message to a counterpart through the second process linked to the second SIM.

3. The method of claim 2, wherein the sending of the text message through the mobile communication service provider network corresponding to the second SIM comprises:
    changing destination information of the generated text message to subscriber information of the first SIM through the second process linked to the second SIM.

4. The method of claim 1, wherein the text message comprises one of a Short Message Service (SMS) message and a Multimedia Message Service (MMS) message.

5. The method of claim 1, wherein the determining the second SIM among the plurality of SIMs comprises:
    designating the second SIM among a plurality of SIMs.

6. An apparatus for sending a text message in a multi Subscriber Identity Module (SIM) mobile terminal, the apparatus comprising:
    an input unit for receiving the text message input by a user;
    a SIM providing unit which mounts a plurality of SIMs; and
    a controller for controlling mobile communication through the plurality of SIMs,
    wherein the controller determines a second SIM which the mobile terminal is configured to use for sending the text message among the plurality of SIMs when receiving the text message to be sent from the input unit, sends, if the text message is generated through a first process linked to a first SIM of the plurality of SIMs, the text message through the first process to a second process linked to the second SIM, and sends the text message through a mobile communication service provider network corresponding to the second SIM,
    wherein the first process corresponds to a processing means using a first mobile communication service provider network through the first SIM,
    wherein the second process corresponds to a processing means using the mobile communication service provider network corresponding to the second SIM,
    wherein the first SIM is different from the second SIM, and
    wherein a controller permits communication between the first process and the second process.

7. The apparatus of claim 6, wherein the controller sends the text message to a counterpart through the second process linked to the second SIM.

8. The apparatus of claim 7, wherein the controller changes destination information of the generated text message to subscriber information of the first SIM through the second process linked to the second SIM.

9. The apparatus of claim 7, wherein the text message comprises one of a Short Message Service (SMS) message and a Multimedia Message Service (MMS) message.

10. The apparatus of claim 6, wherein the controller determines the second SIM among the plurality of SIMs by designating the second SIM.

11. An electronic device for sending a text message, the device comprising:
   at least one processor;
   a non-transitory memory; and
   one or more modules stored in the memory and executed by the at least one processor to perform:
      determining of a second Subscriber Identity Module (SIM) which the device is configured to use for sending the text message among a plurality of SIMs;
      generating, through a first process linked to a first SIM of the plurality of SIMs, the text message;
      sending the text message through the first process to a second process linked to the second SIM; and
      sending the text message through a mobile communication service provider network corresponding to the second SIM,
   wherein the first process corresponds to a processing means using a first mobile communication service provider network through the first SIM,
   wherein the second process corresponds to a processing means using the mobile communication service provider network corresponding to the second SIM,
   wherein the first SIM is different from the second SIM, and
   wherein a controller permits communication between the first process and the second process.

12. The device of claim 11, wherein the sending of the text message through the mobile communication service provider network corresponding to the second SIM comprises:
   sending the text message to a counterpart through the second process linked to the second SIM.

13. The device of claim 12, wherein the sending of the text message through the mobile communication service provider network corresponding to the second SIM comprises:
   changing destination information of the generated text message to subscriber information of the first SIM through the second process linked to the second SIM.

14. The device of claim 11, wherein the text message comprises one of a Short Message Service (SMS) message and a Multimedia Message Service (MMS) message.

15. The device of claim 11, wherein the determining of the second SIM among the plurality of SIMs comprises:
   designating the second SIM among the plurality of SIMs.

* * * * *